US007274851B2

(12) United States Patent
Morris

(10) Patent No.: US 7,274,851 B2
(45) Date of Patent: Sep. 25, 2007

(54) FIBER OPTIC MODULE

(75) Inventor: Terrel L. Morris, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/252,660

(22) Filed: Oct. 18, 2005

(65) Prior Publication Data

US 2007/0086720 A1 Apr. 19, 2007

(51) Int. Cl.
  *G02B 6/00* (2006.01)
  *A47B 77/08* (2006.01)
  *H01R 33/945* (2006.01)
(52) U.S. Cl. .................. 385/135; 312/236; 439/577
(58) Field of Classification Search ............... 385/135, 385/147, 101; 312/236; 439/577
  See application file for complete search history.

(56) References Cited

U.S. PATENT DOCUMENTS

| 5,013,247 | A  | * | 5/1991  | Watson ........................ 439/55 |
| 6,419,399 | B1 | * | 7/2002  | Loder et al. ................... 385/53 |
| 6,508,595 | B1 |   | 1/2003  | Chan et al. |
| 6,634,803 | B2 |   | 10/2003 | Brezina et al. |
| 6,713,672 | B1 |   | 3/2004  | Stickney |
| 6,822,875 | B2 |   | 11/2004 | Chan et al. |
| 6,851,869 | B2 |   | 2/2005  | Miller et al. |
| 2003/0053768 | A1 |   | 3/2003  | Brezina et al. |
| 2005/0281509 | A1 | * | 12/2005 | Cox et al. ..................... 385/59 |

OTHER PUBLICATIONS

SMC S, M, L, XL Connector, SMC Adapter V23834-L6-EX; Infineon Technologies, AG; Muncheon, Germany; Oct. 1, 2001; pp. 1-7.

OIF Very Short Reach (VSR) Interface Implementation Agreements; OJHA, Jugnu J.; Optical Internetworking Forum; 5 pages, no dates.

10 Gigabit Small Form Factor Pluggable Module: INF-8077; XFP Rev. 4.0; SFF Committee; XFP Promoters; Apr. 13, 2004; pp. 97-118.

Agilent AFBR-732B/BE and AFBR-724B/BE Ultra Short Link Pluggable Parallel Fiber Optic Modules, Transmitter and Receiver Data Sheet 5989-1096EN; Agilent Technologies; Mar. 24, 2004; pp. 1-22.

Agilent HFBR-7924 and HFBR-7924E/H/EH Four-Channel Pluggable Parallel Fiber Optic Transceiver "Part of the Agilent Metrak Family" Data Sheet 5989-0360EN; Agilent Technologies; Feb. 1, 2004; pp. 1-17.

Twelve-Channel 2.5G Working Group Phase 1 Specification 12xPFM; Agilent, Gore, Mitel; Feb. 8, 2001; pp. 1-13.

Four-Channel 2.5G Transceiver Working Group Phase 1 Specification—4+4PFM; Agilent, Mitel; Mar. 14, 2001; pp. 1-11.

\* cited by examiner

*Primary Examiner*—Brian Healy
*Assistant Examiner*—Charlie Peng

(57) ABSTRACT

Various embodiments of a fiber optic module adapted for use in an electronic assembly and system are provided. Multiple embodiments of a method of interfacing an electronic assembly with an external circuit through use of the fiber optic module are also provided. In one embodiment, the fiber optic module includes a mounting bracket, a fiber optic connector, and an electrical cable connection. In one embodiment, the method includes: a) providing an electronic assembly comprising a bulkhead panel, a backplane, a fiber optic module, and an electrical cable, b) providing a fiber optic cable associated with the external circuit, and c) removably connecting the fiber optic cable a fiber optic connector of the fiber optic module at the front of the bulkhead panel.

27 Claims, 8 Drawing Sheets

FIBER OPTIC MODULE

BACKGROUND

Electrical-to-optical conversion and vice versa may be accomplished in a fiber optic module. This typically requires measures in the fiber optic module and/or higher assemblies for protecting external circuits from electromagnetic emissions and for cooling optoelectronic components associated with the conversion. These measures may include EMI shields, gaskets, clamps, and other hardware for electromagnetic compatibility (EMC) that make installation and removal of fiber optic cables associated with the fiber optic module complex and time consuming. Moreover, these measures may also include heat sinks, cooling fans, forced air cooling systems, and/or convective cooling systems that increase manufacturing costs and make design of the associated higher assemblies more complex.

SUMMARY

In one aspect, a fiber optic module is provided. In one embodiment, the fiber optic module includes a mounting bracket, a fiber optic connector, and an electrical cable connection. The mounting bracket is adapted to secure the fiber optic module to a bulkhead panel with a front and a back and an aperture there through from the front to the back. The fiber optic module is secured in relation to the aperture. The fiber optic connector is adapted to removably receive a fiber optic cable at the front of the bulkhead panel when the fiber optic module is secured to the bulkhead panel. The fiber optic cable connects the fiber optic module to a first external circuit. The electrical cable connection is adapted to receive an electrical cable at the back of the bulkhead panel when the fiber optic module is secured to the bulkhead panel. The electrical cable connects the fiber optic module to a second external circuit.

DESCRIPTION OF EMBODIMENTS

Figure 1:
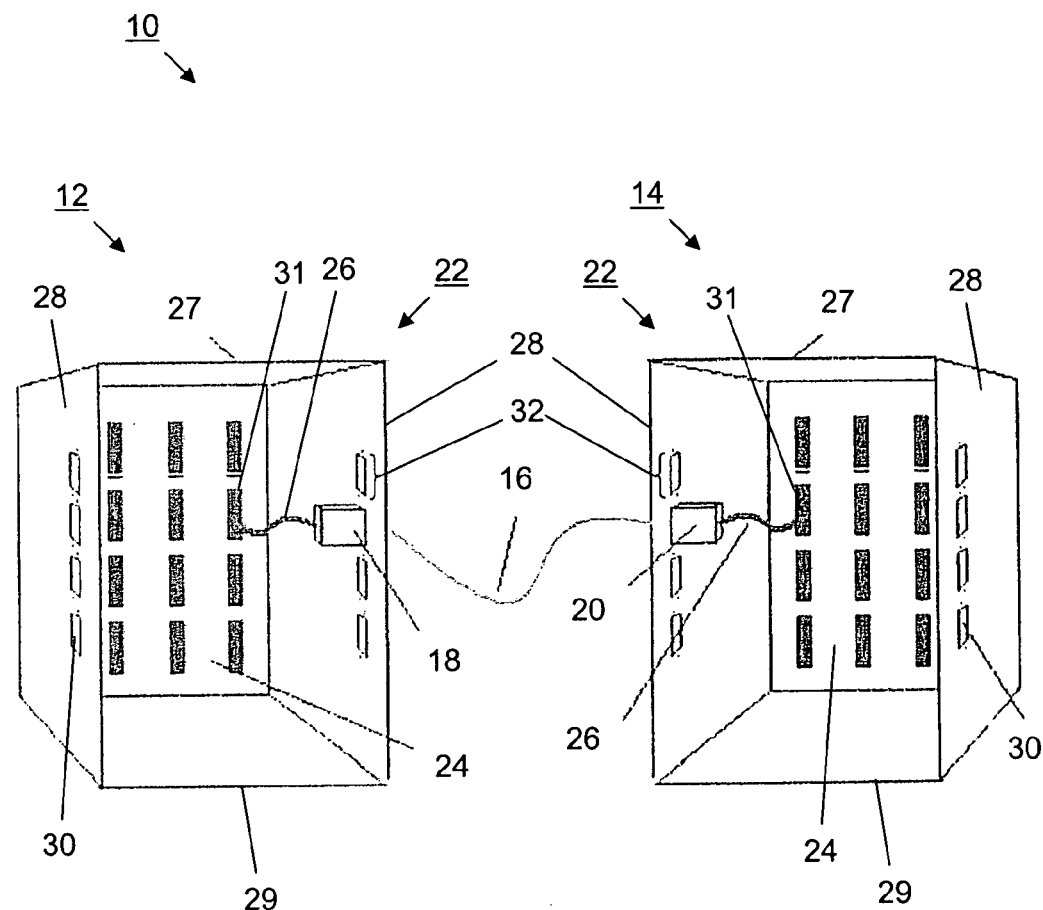
FIG. 1 is an diagram of an embodiment of a cabinet-to-cabinet interconnect using a fiber optic interface.

The following includes definitions of exemplary terms used herein. Both singular and plural forms of all terms fall within each meaning:

"Fiber optic module" as used herein includes, but is not limited to, an element of an electronic assembly or system, such as a transceiver, transmitter, receiver, or another type of fiber optic module, that at least receives or provides one or more fiber optic signals to another element of the electronic assembly or system.

"Bulkhead panel" as used herein includes, but is not limited to, a panel or a portion of an enclosure associated with an electronic assembly or system that partitions one or more elements associated with the electronic assembly or system from one or more elements associated with its external environment. An element associated with the electronic assembly or system may be secured to the bulkhead panel. An element associated with the external environment may interface with the electronic assembly or system via a cable that is removably connected to the element secured to the bulkhead panel. Use of a bulkhead panel typically simplifies connecting and disconnecting the cable between the electronic assembly or system and the external environment and facilitates installation and removal of the electronic assembly/system, cable, and/or corresponding elements associated with the external environment.

"Fiber optic connector" as used herein includes, but is not limited to, a component of a first fiber optic module or cable that connects the corresponding fiber optic module or cable to a counterpart connector associated with a second fiber optic module or cable. The fiber optic connector may be any suitable type, for example, but is not limited to, an FC connector, a FDDI connector, an LC connector, an MT connector, an SC connector, an SC duplex connector, or an ST connector.

"Fiber optic cable" as used herein includes, but is not limited to, a cable containing one or more optical fibers for conducting optical signals in beams of light. The optical fibers may be constructed from any suitable transparent material, including glass, fiberglass, and plastic. The cable may include a fiber optic connector on one end or both ends.

"Optoelectronic component" as used herein includes, but is not limited to, a component within an assembly, such as a fiber optic module, or a circuit that converts one or more optical signals to one or more electrical signals and/or converts one or more electrical signals to one or more optical signals.

"Electronic component" as used herein includes, but is not limited to, a component within an assembly, such as a fiber optic module, or a circuit that conditions one or more electrical signals. For example, the electronic component may amplify, scale, buffer, multiplex, and/or de-multiplex the electrical signal(s). The component, for example, may include one or more active and/or passive components and may be comprised of one or more discreet components and/or one or more integrated circuits.

"Electrical cable connection" as used herein includes, but is not limited to, an area or component of a module or assembly, such as a fiber optic module or printed circuit board, to which an electrical cable is connected. The connection may include, for example, but is not limited to, an electrical connector type connection, a conductive epoxy type connection, a solder type connection, a laser welded type connection, and/or a printed circuit board edge connection.

"Electrical cable" as used herein includes, but is not limited to, a cable containing electrical conductors for conducting electrical signals. The cable, for example, may include one or more twisted conductor pairs as well as additional conductors, signal grounds for conductor pairs, and a shield ground in conjunction with an outer shield. The cable, for example, may be an insulated cable or a ribbon cable.

In various embodiments, a fiber optic module and a corresponding electronic assembly and system are constructed in such a way as to provide a means of translating between optical and electrical signals while also providing a serviceable and accessible connect/disconnect point at a bulkhead panel for external fiber optic connections to the fiber optic module. Additional embodiments may also provide a thermal path to the bulkhead panel to provide cooling for thermally-sensitive optical components. This may permit the fiber optic module to be located in an electronic assembly that does not enjoy good airflow. Other embodiments may provide chassis ground paths and shielding of electromagnetic emissions with regard to the fiber optic module or the electronic assembly. Of course, various features of these embodiments may be combined in any suitable manner. The fiber optic module may be multi-channel for parallel optics, for example, in accordance with multi-source agreements (MSAs) for 12-channel parallel transmitters and receivers (SNAP-12) or 4-channel transceiver (POP-4). The fiber optic module may also be used in multiplexing and de-multiplexing techniques. The fiber optic module is also suitable for other types of signal processing and/or switching for single and multi-channel applications.

With reference to FIG. 1, an embodiment of a cabinet-to-cabinet interconnect 10 shows a first electronic assembly 12 interconnected with a second electronic assembly 14 via a fiber optic cable 16. The fiber optic cable 16 connects between a first fiber optic module 18 of first electronic assembly 12 and a second fiber optic module 20 of second electronic assembly 14. As shown, both electronic assemblies may also include an enclosure 22, an electrical cable 26, and cover plates 30. The enclosure 22 may include a backplane 24, a top panel 27, two bulkhead panels 28, and a bottom panel 29. The electrical cable 26 connects a corresponding fiber optic module (18 or 20) to, for example, electrical connections 31 on the backplane 24. The backplane 24 may be part of a circuit card rack assembly. The electrical connections 31 may provide an electrical interface to circuit card assemblies (not shown) installed in the circuit card rack assembly.

The bulkhead panel 28 includes a front and a back and an aperture there through from front to back. The fiber optic modules (18 and 20) are each secured to a corresponding bulkhead panel 28 in relation to an aperture 32 through the bulkhead panel 28. The fiber optic cable 16 includes connectors at its distal ends that are connected to mating connectors in the fiber optic modules (18 and 20). The aperture 32 in the bulkhead panel 28 provides access so the connector of the fiber optic cable can mate with the connector in the corresponding fiber optic module (18 or 20). The connector in the fiber optic module may protrude through the aperture 32 to the front of the bulkhead panel 28. The connector on the fiber optic cable may also protrude through the aperture 32 to the back of the bulkhead panel 28 when the fiber optic cable 16 is connected to the corresponding fiber optic module (18 or 20). Notably, the fiber optic cable 16 is easily connected and disconnected, facilitating removal and replacement of the cable and installation and maintenance of the cabinets.

The fiber optic modules (18 or 20) may be constructed and secured to the bulkhead panel 28 in a manner that provides a thermal path from optoelectronic components within the fiber optic module (18 or 20) to the bulkhead panel 28. Thus, when the optoelectronic components generate heat during normal operation of the fiber optic modules (18 and 20), the bulkhead panel and the thermal path provide cooling. This method of dissipating heat may cool the optoelectronic component to an extent that additional cooling is not required. Notably, if additional cooling is not required, a fan and an airflow path through the enclosure or other types of convective cooling are not required. Accordingly, the fiber optic modules (18 and 20) may be located in areas that do not enjoy good airflow.

The enclosure 22, including the backplane 24, top panel 27, bulkhead panels 28, bottom panel 29, and an optional rear cover panel (removed), may serve as an electromagnetic interference (EMI) shield to the corresponding fiber optic module (18 or 20) and electrical cable 26. In this embodiment, known methods for EMI protection are used to secure the corresponding fiber optic module (18 or 20) and the cover plates 30 to the bulkhead panel 28. Likewise, known methods for EMI protection are used to assemble the enclosure 22 from the backplane 24, top panel 27, bulkhead panels 28, and bottom panel 29 and known methods for EMI protection are used to secure the rear cover panel (not shown) to the enclosure 22. Additionally, the enclosure may be sufficiently grounded and known methods for EMI protection may be used to provide a chassis ground path from components that generate or conduct electromagnetic emissions in the corresponding fiber optic module (18 or 20) to the bulkhead panel 28.

Depending on the electrical signals conducted by the fiber optic module, in this embodiment, if multiple fiber optic modules (18 or 20) are provided within the same enclosure there may be EMI between the multiple fiber optic modules unless each module is EMI shielded by its own module enclosure. Otherwise, if EMI protection is not required between multiple fiber optic modules (18 or 20) within the enclosure an EMI-shielded enclosure for each fiber optic module is not necessary.

Figure 2:
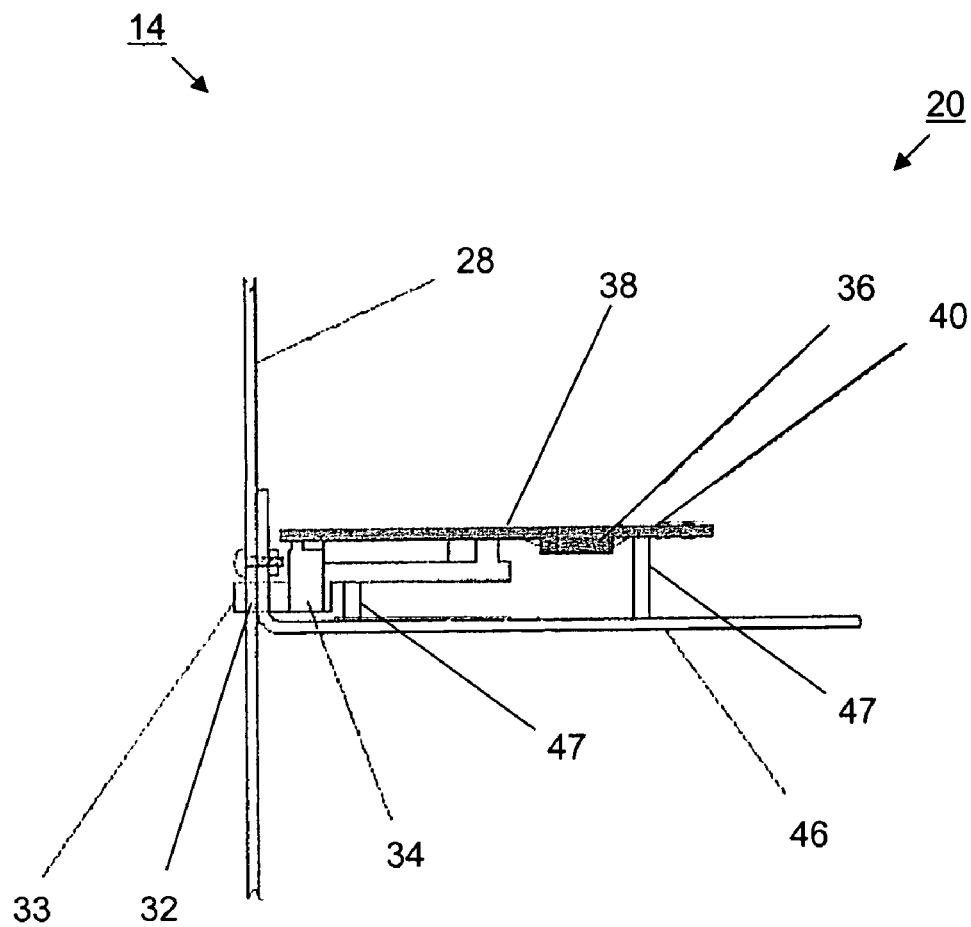
FIG. 2 is a cross sectional view of an embodiment of a fiber optic module secured to a bulkhead panel of an electronic assembly.

With reference to FIG. 2, an embodiment of the fiber optic module 20 secured to the bulkhead panel 28 of second electronic assembly 14 includes a fiber optic connector 33, an optoelectronic component 34, an electronic component 36, a printed circuit board 38, an electrical cable connection 40, a mounting bracket 46, and standoffs 47. The electronic component 36, printed circuit board 38, and standoffs 47 are optional. The mounting bracket 46 secures the fiber optic module 20 to the bulkhead panel 28 in relation to the aperture 32. The mounting bracket 46 may be L-shaped with a first portion secured to the bulkhead panel 28 in relation to an aperture 32 (FIG. 1) through the bulkhead panel 28 and a second portion extending away from a back of the bulkhead panel 28. The mounting bracket 46 may be secured to the back of the bulkhead panel 28, for example, with screws that extend through the bulkhead panel 28 and the first portion of the mounting bracket 46 to mate, for example, with corresponding nuts. In other embodiments, the first portion of the mounting bracket or a portion thereof may extend through the aperture 32 (FIG. 1) to be secured to a front of the bulkhead panel. Moreover, in additional embodiments any suitable type of attaching hardware and/or any suitable fabrication process may be used to secure the mounting bracket 46 to the bulkhead panel 28.

The fiber optic connector 33 is adapted to removably receive the fiber optic cable 16 (FIG. 1) at the front of the bulkhead panel 28 when the fiber optic module 20 is secured to the bulkhead panel. As shown, the fiber optic connector 33 may pass through the aperture 32 (FIG. 1) and slightly protrude from the front of the bulkhead panel 28. In other embodiments, the fiber optic connector 33 may be spaced from the back of the bulkhead panel 28 on the back side or at any position between protruding on the front side to spaced from the back on the back side. When the fiber optic cable 16 (FIG. 1) is properly connected to the fiber optic connector 33, a distal end of the corresponding connector on the fiber optic cable 16 (FIG. 1) may be spaced from the front of the bulkhead panel 28 on the front side, protrude from the back of the bulkhead panel 28 on the back side, or at any position in between depending on the type of connectors involved and the location of the fiber optic connector 33 with respect to the bulkhead panel 28.

The optoelectronic component 34 converts between optical and electrical signals and is in operative communication with the fiber optic connector 33 and the electrical cable connection 40. The optoelectronic component 34 may be a transmitter, receiver, or transceiver. As shown, the fiber optic connector 33 and optoelectronic component 34 may be a commercial off-the-shelf component, such as, for example, Agilent's AFBR-732B 12-channel parallel transmitter, AFBR-742B 12-channel parallel receiver, or HFBR-7924H 4-channel parallel transceiver. In any regard, the fiber optic connector 33 is in operative communication with one or more optical signal ports on the optoelectronic component 34. If included in the fiber optic module 20, the electronic component 36 is in operative communication with one or more electrical signal ports on the optoelectronic component 34. As shown, the electronic component 36 may be an integrated circuit. In other embodiments, the electronic component 36 may be comprised of one or more discrete components, one or more integrated circuits, or any combination thereof.

The electrical cable connection 40 includes connections for one or more conductor pairs. The electrical cable connection 40 is in operative communication with the optoelectronic component 34 and may also be in operative communication with the electronic component 36. The electrical cable connection 40 may include solder type, laser welded type, and/or conductive epoxy type connections on the printed circuit board 38 that are adapted to receive the electrical cable 26 (FIG. 1). In other embodiments, the electrical cable connection 40 may also include printed circuit board edge type connections and/or electrical connector type connections.

The optoelectronic component 34 and electronic component 36 may be installed or mounted on the printed circuit board 38. The printed circuit board 38 may be secured to the mounting bracket 46 via the standoffs 47. In additional embodiments, the printed circuit board 38 may be secured using other types of suitable hardware and/or via other suitable securing methods. Circuit track on the printed circuit board 38 may interconnect the optoelectronic component 34, electronic component 36, and electrical cable connections 40. In additional embodiments, the optoelectronic component 34, electronic component 36, and electrical cable connections 40 may be installed or mounted via any suitable method and interconnected via discreet wiring or a combination of circuit track and discreet wiring.

Figure 3:
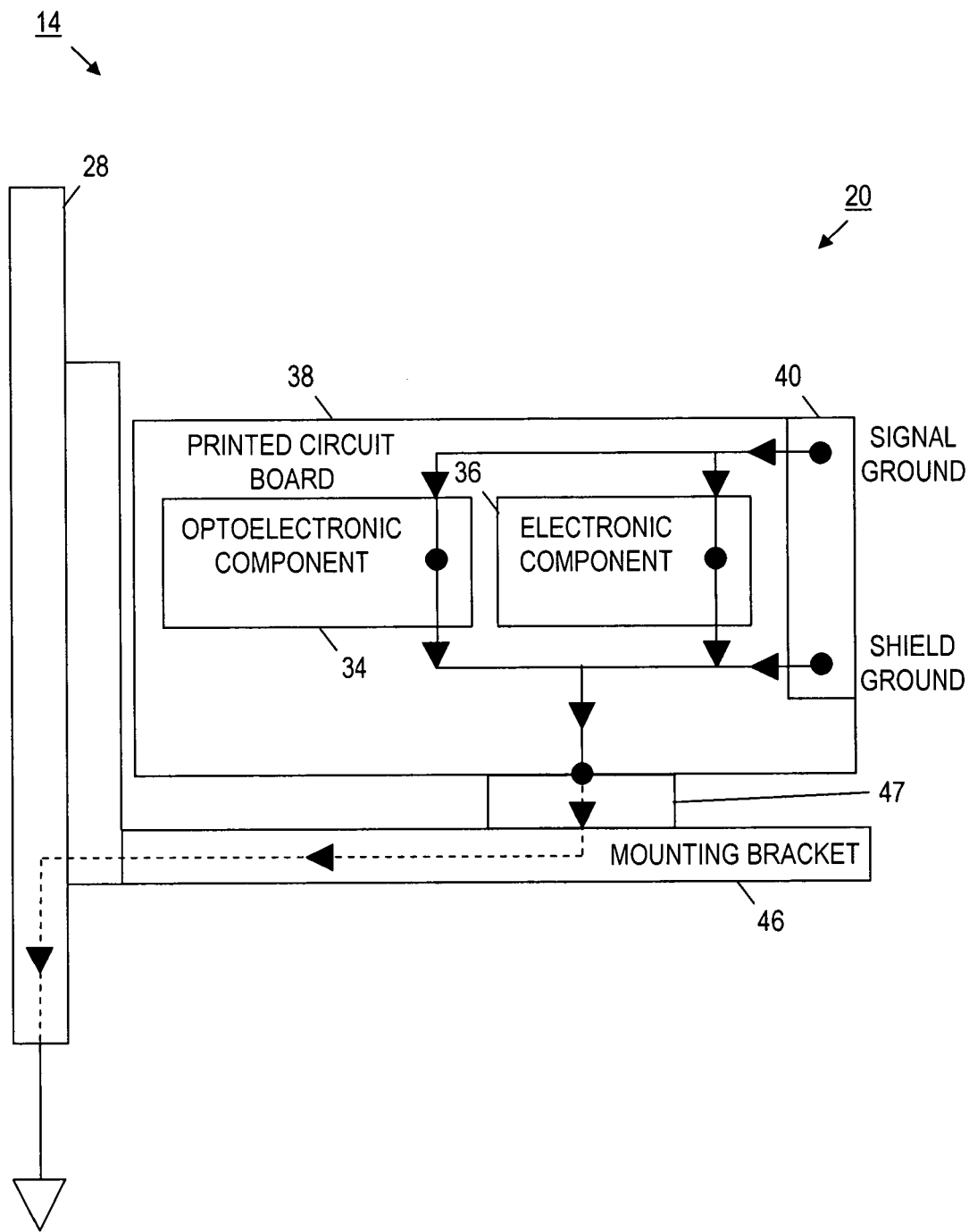
FIG. 3 is a functional diagram of one possible chassis ground path for an embodiment of a fiber optic module secured to a bulkhead panel of an electronic assembly.

In the embodiment shown in FIG. 2, where EMI is of concern, the rear cover panel (not shown) may be installed in order for the enclosure 22 (FIG. 1) to serve as an EMI shield for the fiber optic module 20 as described above in reference to FIG. 1. With reference to FIGS. 1-3, the electrical cable connection 40 may include a signal ground connection for each conductor pair connection to correspond with electrical cables 26 that include signal ground wires for each conductor pair. The electrical cable connection 40 may also include a shield ground connection to correspond with electrical cables 26 that include an outer shield and shield ground wires. The signal grounds may be carried through, for example, circuit track or discreet wiring to the electronic component 36 and optoelectronic component 34. In the embodiment being described, the printed circuit board 38 provides a chassis ground path to the optoelectronic component 34, electronic component 36, and the shield ground connection using known methods for EMI protection. The signal grounds may be tied to the chassis ground path either within the optoelectronic component 34 and electronic component 36 (as shown) or on the printed circuit board via circuit track or discreet wiring. One possible chassis ground path is depicted in FIG. 3 by the solid arrows. The chassis ground path may be extended from the printed circuit board 38 to the mounting bracket 46 using known methods for EMI protection. For example, the chassis ground path may be extended to the mounting bracket 46 via conductive standoffs 47, one or more discreet chassis ground wires, braids, and/or ground straps using known methods for EMI protection. The chassis ground path may be extended to the bulkhead panel 28 using known methods for EMI protection to secure the mounting bracket 46. The bulkhead panel 28 or enclosure 22 may be suitably chassis grounded in accordance with known methods for EMI protection. The combination of the chassis ground connections, chassis ground path, and shielded enclosure limits electromagnetic emissions generated or conducted by the fiber optic module 20 from having an undesirable effect on operation of equipment outside the shielded enclosure, including equipment within other electronic assemblies. In other embodiments, signal and power ground paths may follow separate paths to chassis ground.

Figure 4:
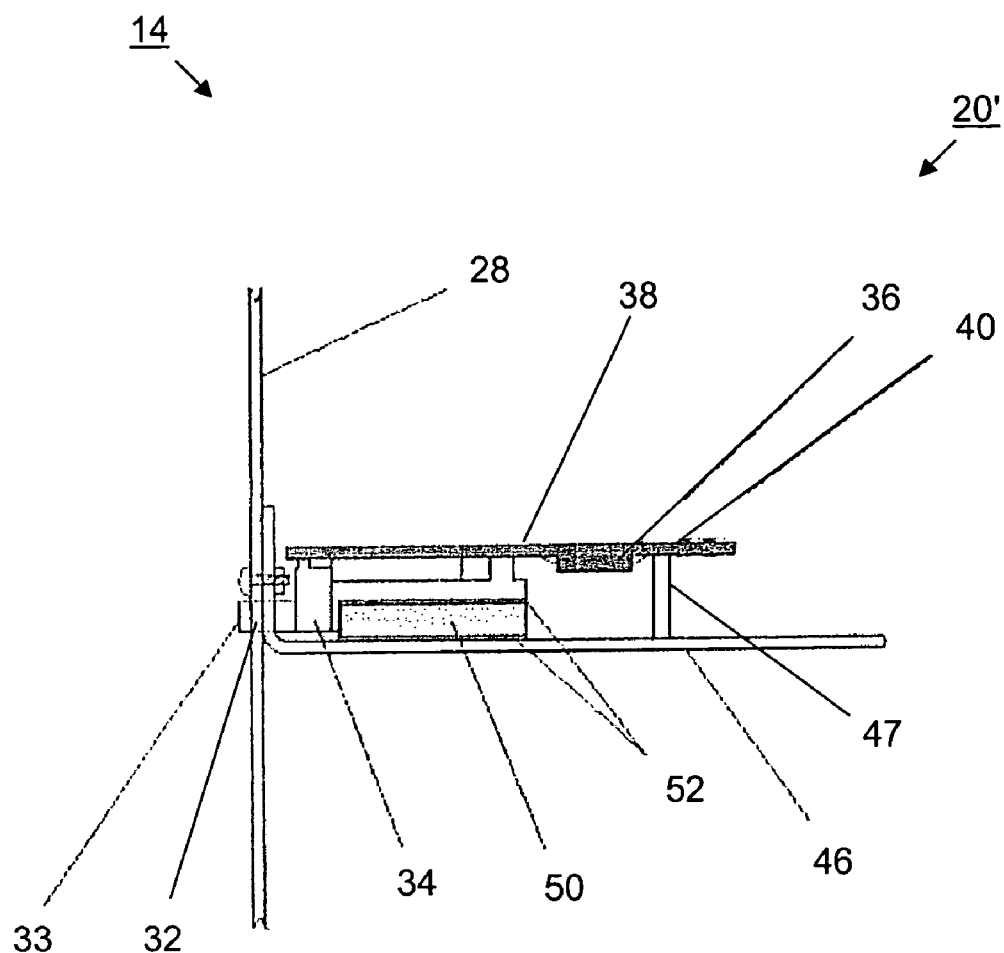
FIG. 4 is a cross sectional view of another embodiment of a fiber optic module secured to a bulkhead panel of an electronic assembly.

With reference to FIG. 4, another embodiment of a fiber optic module 20' secured to the bulkhead panel 20 of second electronic assembly 14 may include a heat transfer slug 50 and heat transfer material 52 along with the other components described above in reference to FIG. 2. The heat transfer material 52 may be a conformal material that conforms, for example, to the shape of the optoelectronic component 34 and the heat transfer slug 50. During operation of the fiber optic module 20', the optoelectronic component 34 converts electrical signaling to optical signaling or vice versa which may produce heat. The heat transfer slug 50 is in thermal communication with the optoelectronic component 34 via heat transfer material 52. The heat transfer material 52 provides a first fill layer between the optoelectronic component 34 and the heat transfer slug 50 that may conform to the surface features of both. The heat transfer slug 50 and heat transfer material 52 may be collectively referred to as a heat transfer component. In other embodiments, the heat transfer component may include a gasket material in place of the heat transfer slug 50 and heat transfer material 52. The gasket material may be a conformal material that conforms, for example, to the shape of the optoelectronic component 34. The heat transfer component may conduct heat sufficiently to facilitate cooling of the optoelectronic component 34 during operation of the fiber optic module 20'.

The heat transfer slug 50 may also be in thermal communication with the mounting bracket 46 via heat transfer material 52. Similarly, the heat transfer material 52 provides a second fill layer between the heat transfer slug 50 and the mounting bracket 46 that may conform to the surface features of both. In other embodiments, a heat transfer component, such as gasket material, may be used in place of the heat transfer slug 50 and both layers of heat transfer material 52. In this arrangement, the heat transfer component (e.g., heat transfer slug 50 and heat transfer material 52, gasket material, etc.) forms a thermal path from the optoelectronic component 34 to the mounting bracket 46. The mounting bracket 46 may also be thermally conductive and further facilitates cooling of the optoelectronic component 34 during operation of the fiber optic module 20'.

Figure 5:
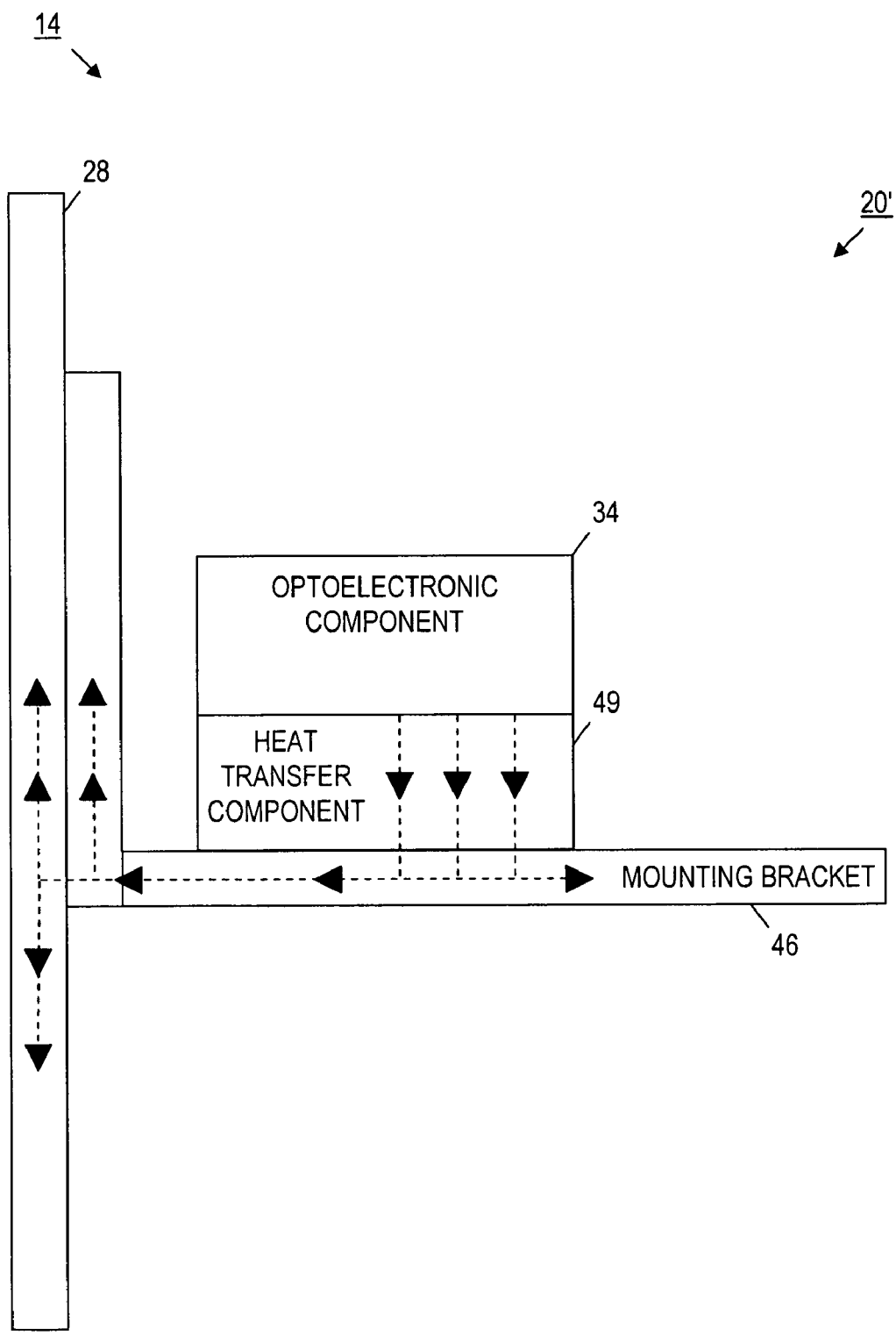
FIG. 5 is a functional diagram of a thermal path to provide cooling for an optoelectronic component in an embodiment of a fiber optic module secured to a bulkhead panel of an electronic assembly.

In the embodiment being described, the mounting bracket 46 may also be in thermal communication with the bulkhead panel 28. For example, the mounting bracket 46, bulkhead panel 28, and any material between the mounting bracket 46 and the bulkhead panel 28 may be sufficiently thermally conductive to extend the thermal path from the optoelectronic component 34 to the bulkhead panel 28. The thermal path is depicted in FIG. 5 by the solid arrows. Heat radiates from the optoelectronic component 34 may be dissipated through the heat transfer component 49, mounting bracket 46, and bulkhead panel 28, thereby cooling the optoelectronic component 34. This arrangement may cool the optoelectronic component 34 to an extent that additional cooling within second electronic assembly 14 is not required. This avoids use of fans, forced air, or convective cooling and permits the fiber optic module 20' to be located within an enclosure that does not enjoy good airflow.

Figure 6:
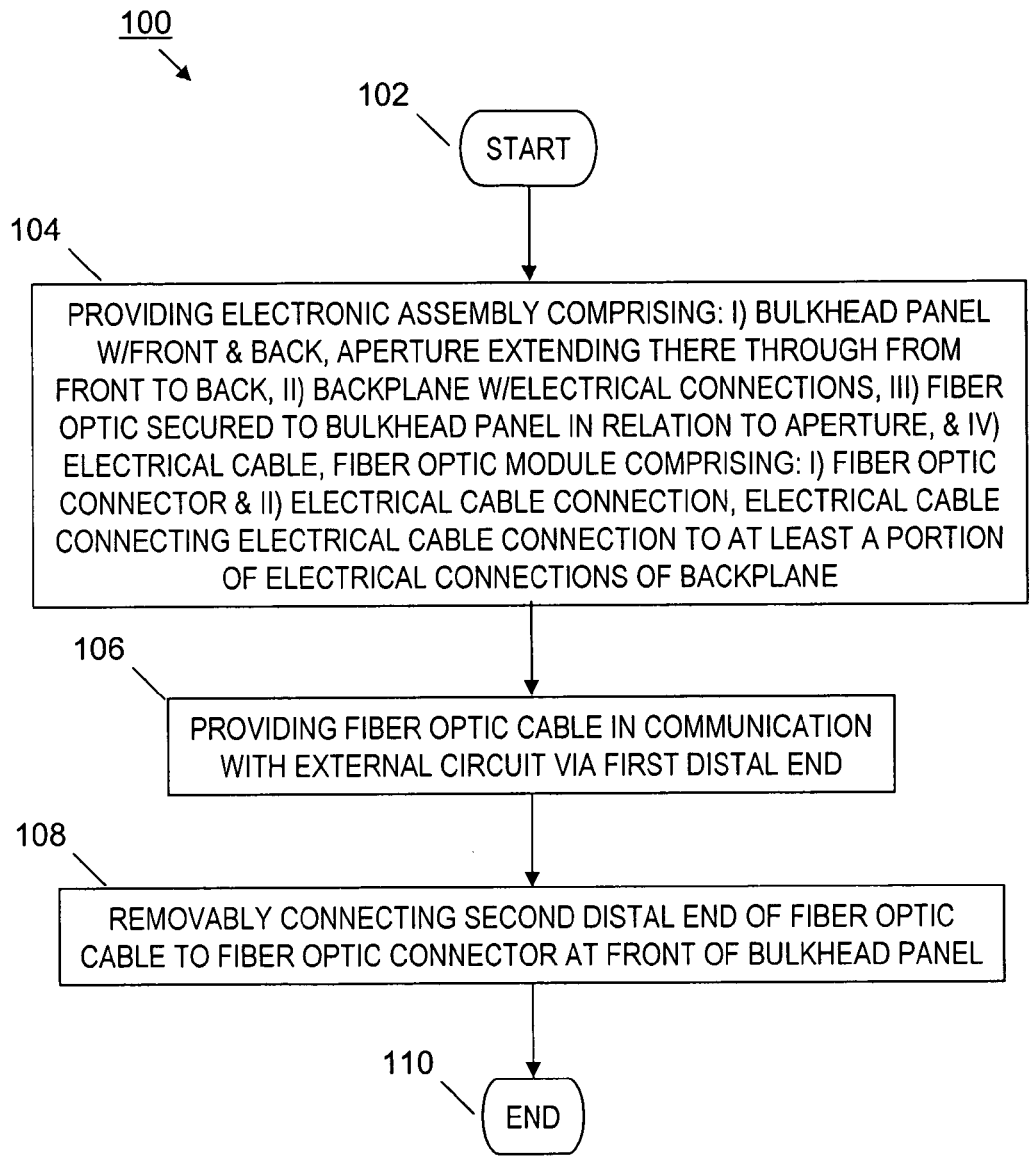
FIG. 6 is a flow chart of an embodiment of a process for interfacing an electronic assembly with an external circuit using fiber optic technology.

With reference to FIG. 6, an embodiment of a process 100 for interfacing an electronic assembly, such as second electronic assembly 14 (FIG. 1), to an external circuit, such as first electronic assembly 12 (FIG. 1), starts at 102. The electronic assembly with i) a bulkhead panel having a front and a back, an aperture extending there through from the front to the back, ii) a backplane with electrical connections, iii) a fiber optic module secured to the bulkhead panel in relation to the aperture, and iv) an electrical cable are provided (104). The fiber optic module includes: i) a fiber optic connector and ii) an electrical cable. The electrical cable connects the electrical cable connection to at least a portion of the electrical connections of the backplane. A fiber optic cable in communication with the external circuit via a first distal end is also provided (106). A connector at a second distal end of the fiber optic cable is removably connected to the fiber optic connector at the front of the bulkhead panel (108). At block 110, the process has reached its end.

In another embodiment, the process 100 may also include providing a mounting bracket securing the fiber optic module to the bulkhead panel in relation to the aperture and an optoelectronic component in operative communication with the fiber optic connector and the electrical cable connection. In still another embodiment, the process 100 may also include providing an electronic component in operative communication with the optoelectronic component and the electrical cable connection.

In another embodiment, in addition to the mounting bracket and optoelectronic component, the process 100 may also include providing cooling to the optoelectronic component. A thermal path may be provided from the optoelectronic component to the bulkhead panel through a heat transfer component in thermal communication with the optoelectronic component and the mounting bracket. In this embodiment, the mounting bracket may also be in thermal communication with the bulkhead panel. While operating the fiber optic module to convert between electrical signaling and optical signaling or vice versa, the optoelectronic component produces heat in conjunction with the converting. The thermal path may cool the optoelectronic component during operation of the fiber optic module at least in part by radiating and dissipating heat produced by the optoelectronic component to the bulkhead panel and other components along the thermal path. The heat transfer component, mounting bracket, and bulkhead panel may cool the optoelectronic component to an extent that additional cooling is not required.

In still another embodiment, in addition to the mounting bracket, the process 100 may provide EMI protection in regard to the fiber optic module. In this embodiment, the bulkhead panel may be part of an enclosure that is suitably chassis grounded. The mounting bracket may be in chassis ground communication with the bulkhead panel. The electrical cable connection may include one or more signal ground connections. A chassis ground path may be provided from the signal ground connections to the shielding enclosure via the mounting bracket and bulkhead panel. This serves to limit electromagnetic emissions generated by the fiber optic module from having an undesirable effect on operation of equipment outside the enclosure via the combination of the chassis ground connections, chassis ground path, and shielding enclosure.

In yet another embodiment, in addition to the mounting bracket, the process 100 may provide EMI protection in regard to the fiber optic module in a different manner from the previous described embodiment. In this embodiment, the bulkhead panel may be suitably chassis grounded. The mounting bracket may be in chassis ground communication with the bulkhead panel. The electrical cable connection may include one or more signal ground connections. An outer shell is provided with the fiber optic module. The outer shell may be secured to the mounting bracket so that outer shell and the mounting bracket form an enclosure shielding the fiber optic module. A chassis ground path may be provided from the signal ground connections to the bulkhead panel via the shielding enclosure. This serves to limit electromagnetic emissions generated by the fiber optic module from having an undesirable effect on operation of equipment outside the module enclosure via the combination of the chassis ground connections, chassis ground path, and shielding enclosure.

Figure 7:
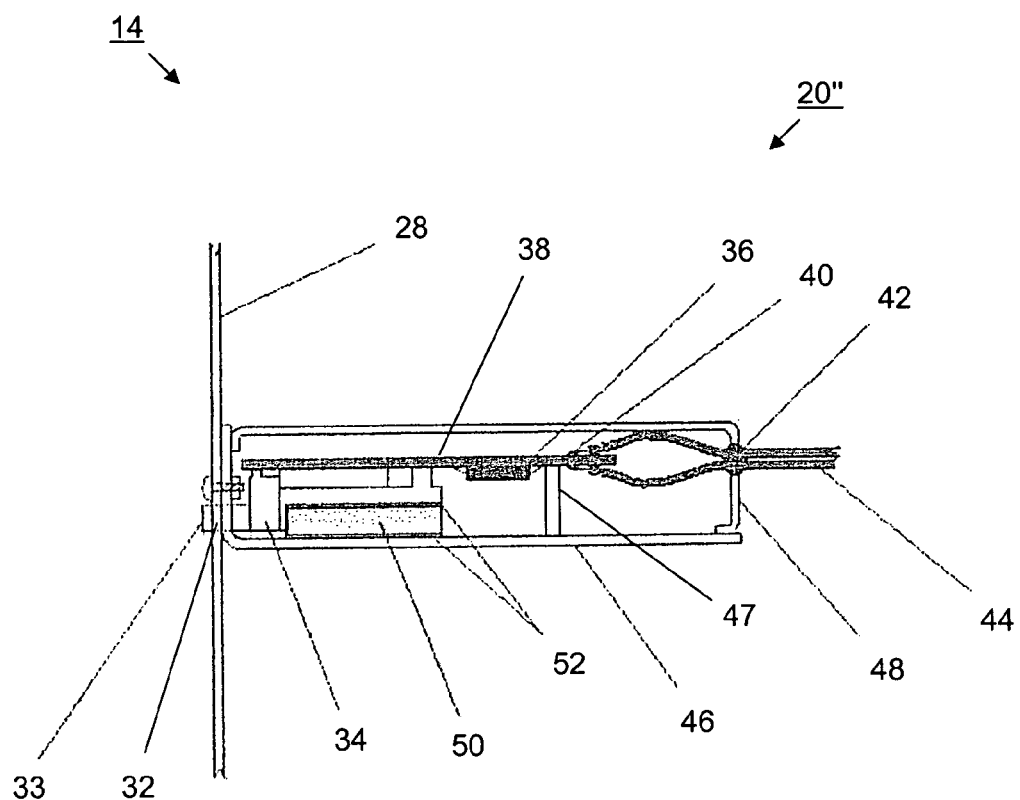
FIG. 7 is a cross sectional view of yet another embodiment of a fiber optic module secured to a bulkhead panel of an electronic assembly.

With reference to FIG. 7, yet another embodiment of a fiber optic module 20" secured to the bulkhead panel 28 of second electronic assembly 14 may include an outer shell 48 along with the other components described above in reference to FIGS. 2 and 4. The outer shell 48 may be secured to the mounting bracket 46 to address further EMI concerns, particularly in regard to electronic assemblies having multiple fiber optic modules secured to the bulkhead panel where one or more fiber optic modules are operating at frequencies making them more susceptible to EMI. In this embodiment, the outer shell 48 and the mounting bracket 46 may form an enclosure to shield the fiber optic module 20" to facilitate electromagnetic compatibility (EMC) among, for example, multiple fiber optic modules in proximity of each other.

With reference to FIGS. 1, 3, and 7, in this embodiment, signal, shield, and chassis ground connections may form a chassis ground path for the fiber optic module 20" in the same manner as described above in reference to FIGS. 1-3. Additionally, the outer shell 48 may be secured to the mounting bracket 46 using known methods for EMI protection. The outer shell 48 may also be tied to the shield ground connection associated with the electrical cable connection 40 using known methods for EMI protection. The bulkhead panel 28 may be suitably chassis grounded in accordance with known methods for EMI protection. The combination of the chassis ground connections, chassis ground path, and the shielded enclosure formed by the mounting bracket 46 and outer shell 48 limit electromagnetic emissions generated or conducted by the fiber optic module 20″ from having an undesirable effect on operation of equipment outside the shielded enclosure, including other fiber optic modules.

Figure 8:
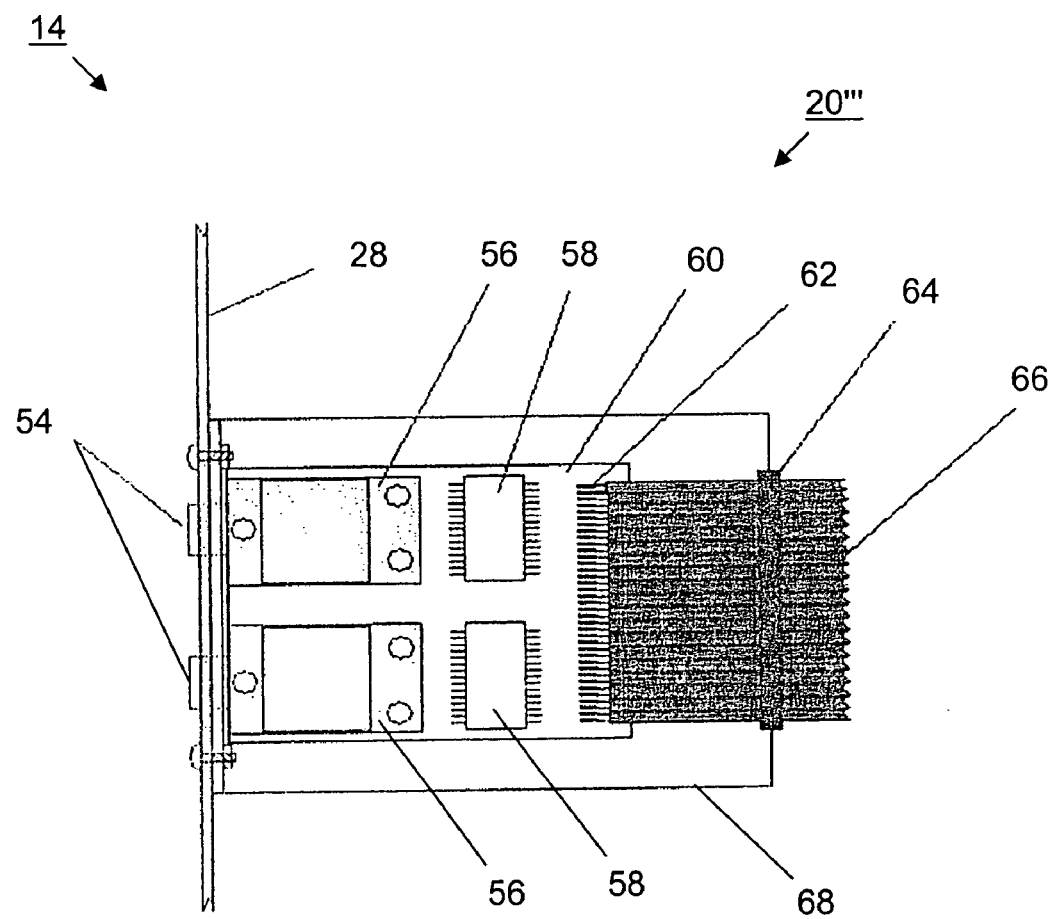
FIG. 8 is a cross sectional view of still another embodiment of a fiber optic module secured to a bulkhead panel of an electronic assembly.

With reference to FIG. 8, still another embodiment of a fiber optic module 20‴ secured to the bulkhead panel 28 of second electronic assembly 14 may include multiple optoelectronic assemblies 56 and multiple electronic assemblies 58 in a view showing the mounting bracket 46 partially removed. This embodiment of the fiber optic module 20‴ may also provide multiple fiber optic connectors 54 to which multiple fiber optic cables 16 (FIG. 1) may be connected. Otherwise, the physical, thermal protection, and EMI protection characteristics of this embodiment are as described above in reference to the various embodiments of FIGS. 1-7. The various embodiments discussed above are also available with respect to this embodiment of the fiber optic module 20‴.

In summary, in various embodiments of the fiber optic module, electronic assembly, and electronic system described above, the conductive thermal path may carry away heat generated by the optoelectronic component and fiber optical module through the heat transfer component and mounting bracket to the bulkhead panel. Additional conductive thermal paths, such as known types of heat sinks, can be provided and mounted using, for example, circuit board standoffs. In at least some embodiments, the thermal path to the bulkhead panel may not require a fan, forced air, or convective cooling in order to cool the optoelectronic component and fiber optic module. The mass of the bulkhead panel and the other components in the thermal path may provide sufficient heat sinking in a temperature controlled environment to dissipate the heat generated by the optoelectronic component and fiber optic module.

Additionally, in various embodiments of the fiber optic module, electronic assembly, and electronic system described above, the EMI shield or chassis ground path for the fiber optic module may be provided, at least in part, by the bulkhead panel. The interface between the electrical signaling domain and the optical signaling domain may be positioned such that the boundary occurs at the bulkhead panel. Since the fiber optic module may operate in an area that is saturated with electromagnetic emissions, in some embodiments, an outer shield (see FIG. 7) may be provided to prevent in-cabinet (electronic assembly) EMI from affecting fiber optic module operation. This may also provide a return path (signal ground) for common-mode signals on the electrical cable shields to the bulkhead panel.

Moreover, in each embodiment of the fiber optic module, electronic assembly, and electronic system described above, the interface connection between cabinets or electronic assemblies is easily detached by unplugging the optical connector at the bulkhead panel. In particular, special disassembly or disturbance of the EMI enclosure or shield may not need to occur. In other words, brackets, bolts, clamps, or other mechanical devices associated with EMI protection may not need to be disassembled or disturbed. This simplifies system installation and service.

In general, in one embodiment, electrical signals to be transmitted may be carried from a backplane connector or other electrical connections 31 on the backplane 24, through the electrical cable to terminating components, such as the electronic component, via the electrical cable connections on the fiber optic module. At the optoelectronic component, the electrical signals may be translated to optical signals and routed out of the fiber optic module through the fiber optic connector. In the case of received signals, the order is reversed, that is optical signals may come in to the fiber optic module at the fiber optic connector. The optical signals may be converted to electrical signals at the optoelectronic component. The electrical signals may be conditioned, as needed, by the electronic component and sent out through the electrical cable connection and electrical cable to the backplane connector or other electrical connections 31 on the backplane 24.

Due to the low power of the components within the fiber optic module, at least two means of providing power may be available. Namely, power distribution using one pair of conductors on the electrical cable or a separate power pigtail cord that connects to a system backplane or other power source may be provided.

Certain embodiments of the fiber optic module described above may allow implementation of an electrical-to-optical and optical-to-electrical conversion to take place within an electronic assembly or system that was not designed specifically for such an implementation. In other words, the fiber optic module may solve thermal, power, signaling, and/or EMI concerns associated with such electronic assemblies or systems without requiring re-design or re-fitment of the electronic assembly or system. Moreover, it also allows much simpler attachment and detachment of the fiber optic cable interface to the electronic assembly or system.

Additionally, certain embodiments of the fiber optic module described above may allow an electrical-to-optical and optical-to-electrical conversion to take place within the constraints of a traditional electrical cable, while also allowing the fiber optic module to operate in an area of an electronic assembly or system that does not provide adequate airflow to cool optical or optoelectronic components and does not provide power at the point of conversion. Furthermore, it may allow the conversion to be implemented in a manner that is consistent with good EMI enclosure design practices. The fiber optic module may allow separation of the optical interconnect at an EMI bulkhead panel connection that does not require disassembly of EMI gaskets, shells, clamps, or other hardware. Additionally, it may allow removal of the electrical cable connector from a system backplane without disturbing the optical cable or mounting of the fiber optic module.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, components and circuitry can be changed without changing the substantive functions performed by the components and circuitry described herein. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed:

1. A fiber optic module assembly, including:
a mounting bracket adapted to secure a fiber optic module to a bulkhead panel with a front and a back and an aperture there through from the front to the back, the fiber optic module being secured in relation to the aperture;

a fiber optic connector adapted to removably receive a fiber optic cable at the front of the bulkhead panel when the fiber optic module is secured to the bulkhead panel, the fiber optic cable connecting the fiber optic module to a first external circuit;

an electrical cable connection adapted to receive an electrical cable at the back of the bulkhead panel when the fiber optic module is secured to the bulkhead panel, the electrical cable connecting the fiber optic module to a second external circuit;

an optoelectronic component in operative communication with the fiber optic connector and the electrical cable connection;

a heat transfer component in thermal communication with the optoelectronic component to facilitate cooling of the optoelectronic component during operation of the fiber optic module; and wherein the heat transfer component is also in thermal communication with the mounting bracket to form a thermal path from the optoelectronic component to the mounting bracket to facilitate cooling of the optoelectronic component during operation of the fiber optic module.

2. The fiber optic module assembly of claim 1, further including:

an electronic component in operative communication with the optoelectronic component and the electrical cable connection.

3. The fiber optic module assembly of claim 1 wherein the mounting bracket is in thermal communication with the bulkhead panel when the mounting bracket is secured to the bulkhead panel to extend the thermal path from the optoelectronic component to the bulkhead panel to facilitate cooling of the optoelectronic component during operation of the fiber optic module.

4. The fiber optic module assembly of claim 3 wherein the heat transfer component, mounting bracket, and bulkhead panel cool the optoelectronic component to an extent that additional cooling is not required.

5. The fiber optic module assembly of claim 1 wherein the electrical cable connection includes one or more signal ground connections and the signal ground connections are in communication with the mounting bracket via chassis ground connections.

6. The fiber optic module assembly of claim 5 wherein the bulkhead panel is part of an enclosure that is suitably chassis grounded and adapted to shield the fiber optic module and, when the mounting bracket is secured to the bulkhead panel, the mounting bracket is in chassis ground communication with the bulkhead panel and the enclosure forming a chassis ground path for the fiber optic module, wherein the chassis ground connections, chassis ground path, and shielding enclosure are such that the combination thereof limits electromagnetic emissions generated or conducted by the fiber optic module from having an undesirable effect on operation of equipment outside the enclosure.

7. The fiber optic module assembly of claim 5, further including:

an outer shell secured to the mounting bracket, the outer shell and mounting bracket forming an enclosure to shield the fiber optic module;

wherein the bulkhead panel is suitably chassis grounded and, when the mounting bracket is secured to the bulkhead panel, the mounting bracket is in chassis ground communication with the bulkhead panel forming a chassis ground path for the fiber optic module, wherein the chassis ground connections, chassis ground path, and shielding enclosure are such that the combination thereof limits electromagnetic emissions generated or conducted by the fiber optic module from having an undesirable effect on operation of equipment outside the enclosure.

8. The fiber optic module assembly of claim 1 wherein the fiber optic module is a fiber optic transceiver, a fiber optic transmitter, or a fiber optic receiver.

9. The fiber optic module assembly of claim 1 wherein the electrical cable connection is a solder type connection, a conductive epoxy type connection, a laser welded type connection, a printed circuit board edge type connection, or an electrical connector type connection.

10. An electronic assembly, including:

a bulkhead panel having a front and a back with an aperture extending there through from the front to the back;

a backplane with a plurality of electrical connections;

a fiber optic module disposed in relation to the aperture and installed on the bulkhead panel, the fiber optic module including:

a fiber optic connector adapted to removably receive a fiber optic cable at the front of the bulkhead panel to connect the electronic assembly to an external circuit; and an electrical cable connection; and an electrical cable connecting the electrical cable connection to at least a portion of the plurality of electrical connections of the backplane;

a mounting bracket securing the fiber optic module to the bulkhead panel in relation to the aperture;

an optoelectronic component in operative communication with the fiber optic connector and the electrical cable connection; and a heat transfer component in thermal communication with the optoelectronic component and the mounting bracket to form a thermal path from the optoelectronic component to the mounting bracket, wherein the mounting bracket is in thermal communication with the bulkhead panel extending the thermal path to the bulkhead panel, wherein the heat transfer component, mounting bracket, and bulkhead panel facilitate cooling of the optoelectronic component during operation of the fiber optic module to an extent that supplemental cooling is not required.

11. The electronic assembly of claim 10, the fiber optic module further including:

an electronic component in communication with the optoelectronic component and the electrical cable connection.

12. The electronic assembly of claim 10 wherein the electrical cable connection includes one or more signal ground connections in communication with the mounting bracket via chassis ground connections.

13. The electronic assembly of claim 12 wherein the bulkhead panel is part of an enclosure that is suitably chassis grounded and adapted to shield the fiber optic module, wherein the mounting bracket is in chassis ground communication with the bulkhead panel and the enclosure forming a chassis ground path for the fiber optic module, wherein the combination of the chassis ground connections, chassis ground path, and shielding enclosure limits electromagnetic emissions generated or conducted by the fiber optic module from interfering with operation of equipment outside the enclosure.

14. The electronic assembly of claim 12, the fiber optic module further including:
an outer shell secured to the mounting bracket, the outer shell and mounting bracket forming an enclosure to shield the fiber optic module;
wherein the bulkhead panel is suitably chassis grounded, wherein the mounting bracket is in chassis ground communication with the bulkhead panel forming a chassis ground path for the fiber optic module, wherein the combination of the chassis ground connections, chassis ground path, and shielding enclosure limits electromagnetic emissions generated or conducted by the fiber optic module from interfering with operation of equipment outside the enclosure.

15. An electronic system, comprising:
an electronic assembly, including:
a bulkhead panel with a front and a back, an aperture extending there through from the front to the back;
a backplane with electrical connections;
a fiber optic module secured to the bulkhead panel in relation to the aperture, the fiber optic module including:
a fiber optic connector; and
an electrical cable connection; and
an electrical cable connecting the electrical cable connection to at least a portion of the electrical connections of the backplane;
a fiber optic cable connected to the fiber optic connector at the front of the bulkhead panel and thereby connecting the electronic assembly to an external circuit;
a mounting bracket securing the fiber optic module to the bulkhead panel in relation to the aperture;
an optoelectronic component in operative communication with the fiber optic connector and the electrical cable connection; and
a heat transfer component forming a thermal path from the optoelectronic component to the mounting bracket, wherein the mounting bracket is in thermal communication with the bulkhead panel to extend the thermal path to the bulkhead panel, wherein the heat transfer component, mounting bracket, and bulkhead panel facilitate cooling of the optoelectronic component during operation of the fiber optic module to an extent that other cooling is not required.

16. The electronic system of claim 15 wherein the electrical cable connection includes one or more signal ground connections in communication with the mounting bracket via chassis ground connections.

17. The electronic system of claim 16 wherein the bulkhead panel is part of an enclosure that is suitably chassis grounded and adapted to shield the fiber optic module, the mounting bracket is in chassis ground communication with the bulkhead panel and the enclosure forming a chassis ground path for the fiber optic module, wherein the chassis ground connections, chassis ground path, and shielding enclosure are constructed and arranged such that the combination thereof limits electromagnetic emissions generated or conducted by the fiber optic module from bothering operation of equipment outside the enclosure.

18. The electronic system of claim 16, the fiber optic module further including:
an outer shell secured to the mounting bracket, the outer shell and mounting bracket forming an enclosure to shield the fiber optic module;
wherein the bulkhead panel is suitably chassis grounded and the mounting bracket is in chassis ground communication with the bulkhead panel forming a chassis ground path for the fiber optic module, wherein the chassis ground connections, chassis ground path, and shielding enclosure are constructed and arranged such that the combination thereof limits electromagnetic emissions generated or conducted by the fiber optic module from bothering operation of equipment outside the enclosure.

19. A method of interfacing an electronic assembly to an external circuit, including:
a) providing the electronic assembly comprising: i) a bulkhead panel with a front and a back, an aperture extending there through from the front to the back, ii) a backplane with electrical connections, iii) a fiber optic module secured to the bulkhead panel in relation to the aperture, and iv) an electrical cable, the fiber optic module comprising: i) a fiber optic connector and ii) an electrical cable connection, the electrical cable connecting the electrical cable connection to at least a portion of the electrical connections of the backplane;
b) providing a fiber optic cable in communication with the external circuit via a first distal end;
c) removably connecting a second distal end of the fiber optic cable to the fiber optic connector at the front of the bulkhead panel;
d) providing a mounting bracket securing the fiber optic module to the bulkhead panel in relation to the aperture and an optoelectronic component in operative communication with the fiber optic connector and the electrical cable connection;
e) providing a thermal path from the optoelectronic component to the bulkhead panel through a heat transfer component in thermal communication with the optoelectronic component and the mounting bracket, wherein the mounting bracket is in thermal communication with the bulkhead panel;
f) operating the fiber optic module to convert between electrical signaling and optical signaling or vice versa, the optoelectronic component producing heat in conjunction with the converting; and
g) cooling the optoelectronic component during operation of the fiber optic module at least in part by radiating and dissipating heat produced by the optoelectronic component to the bulkhead panel along the thermal path.

20. The method of claim 19 wherein the heat transfer component, mounting bracket, and bulkhead panel cool the optoelectronic component to an extent that additional cooling is not required.

21. The method of claim 19 wherein the bulkhead panel is part of an enclosure that is suitably chassis grounded and adapted to shield the fiber optic module, the mounting bracket is in chassis ground communication with the bulkhead panel, and the electrical cable connection includes one or more signal ground connections, the method further including:
providing a chassis ground path from the signal ground connections to the shielding enclosure via the mounting bracket and bulkhead panel; and
limiting electromagnetic emissions generated by the fiber optic module from having an undesirable effect on operation of equipment outside the enclosure via the combination of the chassis ground connections, chassis ground path, and shielding enclosure.

22. The method of claim 19 wherein the bulkhead panel is suitably chassis grounded, the mounting bracket is in chassis ground communication with the bulkhead panel, and the electrical cable connection includes one or more signal ground connections, the method further including:

providing an outer shell with the fiber optic module that is secured to the mounting bracket so the outer shell and the mounting bracket form an enclosure shielding the fiber optic module;

providing a chassis ground path from the signal ground connections to the bulkhead panel via the shielding enclosure; and limiting electromagnetic emissions generated by the fiber optic module from having an undesirable effect on operation of equipment outside the enclosure via the combination of the chassis ground connections, chassis ground path, and shielding enclosure.

23. A fiber optic assembly, including:

a mounting bracket for mounting the assembly to an enclosure;

a circuit board coupled to the mounting bracket;

a fiber optic connector connecting the circuit board to at least one fiber optic cable;

an electrical cable connection connecting the circuit board to at least one electrical cable;

an optoelectronic component coupled to the circuit board;

a heat transfer assembly in thermal communication with the optoelectronic component and the mounting bracket to form a thermal path from the optoelectronic component to the mounting bracket to facilitate cooling of the optoelectronic component during operation of the fiber optic module assembly.

24. The assembly of claim 23 wherein the heat transfer assembly comprises a heat transfer slug.

25. The assembly of claim 23 wherein the heat transfer assembly comprises a heat transfer slug and a heat transfer material in thermal communication with the slug and the optoelectronic component.

26. The assembly of claim 23 wherein the heat transfer assembly comprises a heat transfer slug and a heat transfer material in thermal communication with the slug and the mounting bracket.

27. The assembly of claim 23 wherein the heat transfer assembly comprises a heat transfer slug and a heat transfer material in thermal communication with the slug, optoelectronic component and mounting bracket.

* * * * *